(12) United States Patent
Shumate

(10) Patent No.: US 6,983,587 B2
(45) Date of Patent: Jan. 10, 2006

(54) METHOD AND APPARATUS FOR THRUST AUGMENTATION FOR ROCKET NOZZLES

(76) Inventor: James Shumate, 18857 - 127th Pl., SE., Renton, WA (US) 98058

( * ) Notice: Subject to any disclaimer, the term of this patent is extended or adjusted under 35 U.S.C. 154(b) by 100 days.

(21) Appl. No.: 10/282,219

(22) Filed: Oct. 28, 2002

(65) Prior Publication Data

US 2004/0079072 A1 Apr. 29, 2004

(51) Int. Cl.
| | |
|---|---|
| B63H 11/00 | (2006.01) |
| B64G 9/00 | (2006.01) |
| F02K 9/00 | (2006.01) |
| F03H 9/00 | (2006.01) |
| F23R 9/00 | (2006.01) |

(52) U.S. Cl. .................. 60/204; 60/200.1; 60/211; 60/231; 60/257

(58) Field of Classification Search ............... 60/200.1, 60/2.4, 211, 228, 229, 231, 240, 770, 257, 60/269, 264

See application file for complete search history.

(56) References Cited

U.S. PATENT DOCUMENTS

| | | | |
|---|---|---|---|
| 2,211,795 A | | 8/1940 | Sauer |
| 2,293,632 A | | 8/1942 | Sauer |
| 2,851,853 A | * | 9/1958 | Quick .................. 60/262 |
| 3,047,208 A | * | 7/1962 | Coanda .................. 417/174 |
| 3,198,459 A | * | 8/1965 | Geary .................. 244/73 R |
| 3,316,716 A | * | 5/1967 | Escher .................. 60/225 |
| 3,525,474 A | | 8/1970 | Ohain |
| 3,575,261 A | | 4/1971 | Medawar |
| 3,593,525 A | * | 7/1971 | Holmes .................. 60/254 |
| 3,739,984 A | | 6/1973 | Tontini |
| 3,795,367 A | | 3/1974 | Mocarski |
| 3,910,375 A | | 10/1975 | Hache et al. |
| 4,063,415 A | | 12/1977 | Rhoades |
| 4,196,585 A | * | 4/1980 | Svischev et al. .................. 60/264 |
| 4,448,354 A | | 5/1984 | Reznick et al. |
| 4,567,960 A | | 2/1986 | Johnson et al. |
| 4,592,202 A | | 6/1986 | Stewart et al. |
| 4,667,900 A | * | 5/1987 | Kim .................. 244/53 B |
| 4,686,824 A | * | 8/1987 | Dunaway et al. .................. 60/231 |
| 5,191,761 A | | 3/1993 | Janeke |
| 5,282,359 A | * | 2/1994 | Chester .................. 60/269 |
| 5,341,640 A | | 8/1994 | Faulkner |
| 6,003,301 A | | 12/1999 | Bratkovich et al. |
| 6,568,171 B2 | * | 5/2003 | Bulman .................. 60/224 |
| 2002/0059800 A1 | | 5/2002 | Vuillamy et al. |

OTHER PUBLICATIONS

Takashi, JP 11107858A, Abstract, "Engine Testing Device", Apr. 20, 1999.
Karman, "Theoretical Remarks on Thrust Augmentation", pp. 461–468.
Loh, W.H.T., "Jet, Rocket, Nuclear, Ion and Electric Propulsion: Theory and Design", Springer–Verlug, New York Inc, 1968, p. 289.
Hill, Peterson, "Plug and Expansion–Deflection Nozzles", Mechanics and Thermodynamics of Propulsion, Addison–Wesley Publishing Company, Inc., p. 413 (2 pages).

* cited by examiner

Primary Examiner—William H. Rodriguez
(74) Attorney, Agent, or Firm—R. Reams Goodloe, Jr.

(57) ABSTRACT

A method and apparatus for augmenting thrust in a rocket traveling through atmospheric gas. Rocket motor designs are provided where a throat(s) from one or more rocket motors eject high-speed primary exhaust gas in a configuration which peripherally surrounds an outlet for induced, secondary gas. The secondary gas is mixed with the jet of primary exhaust gas to add momentum, and therefore thrust. Either expansion deflection or plug type rocket discharge nozzles can be utilized. In one embodiment, a thrust augmentation of over one hundred percent is achieved. In another embodiment, a plurality of rocket motor assemblies each containing a thrust augmenting rocket motor design is affixed to a rocket body. Such rocket motors enhance rocket thrust performance, and enables more efficient payload to rocket motor selection, or, alternatively, allows higher loads to be carried with the same amount of thrust.

37 Claims, 6 Drawing Sheets

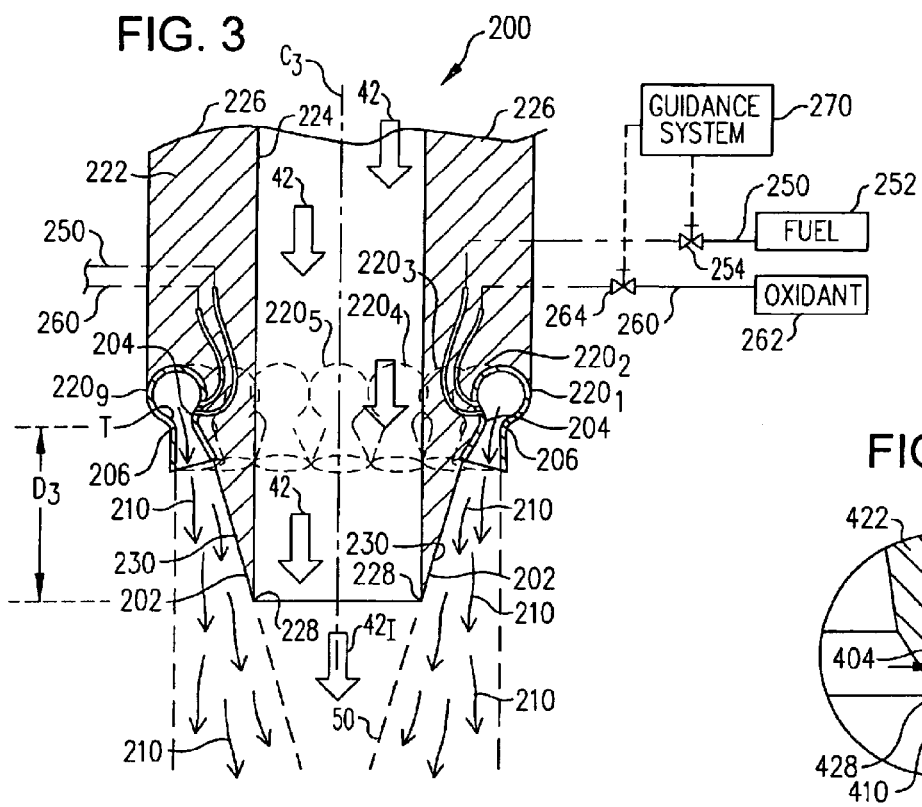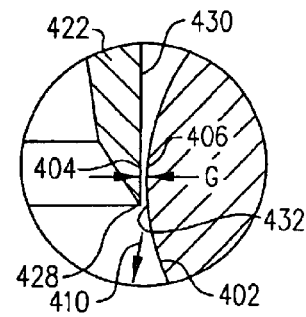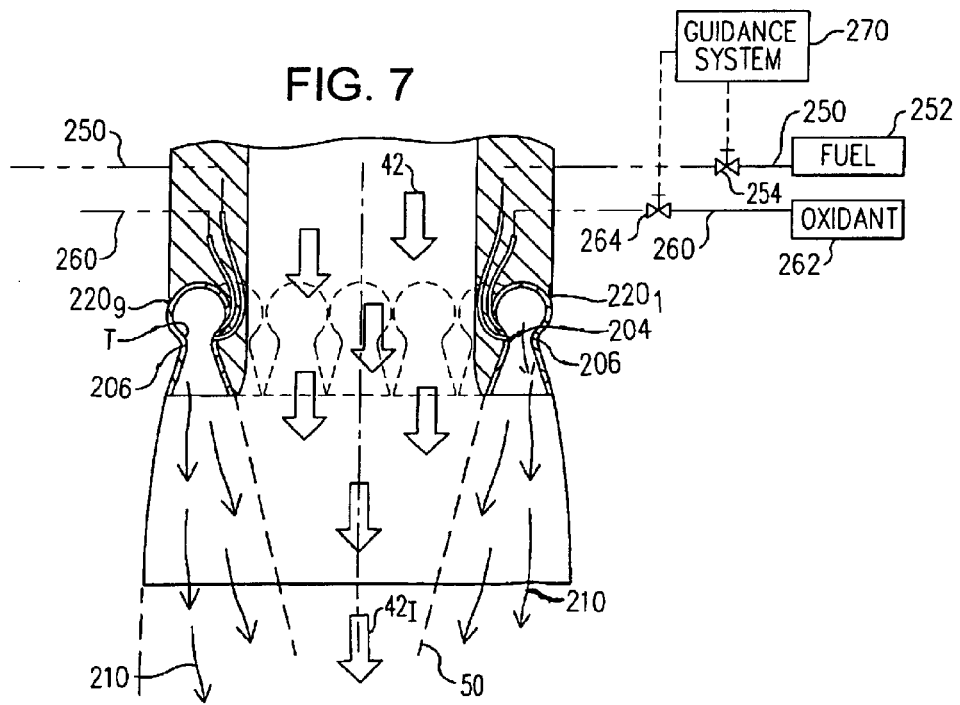

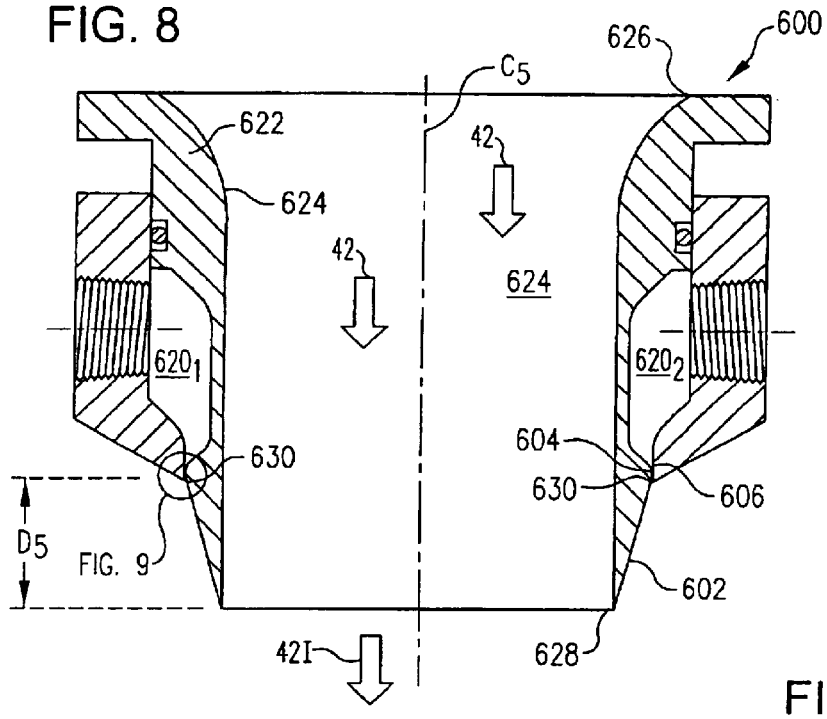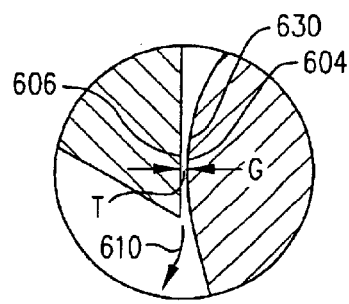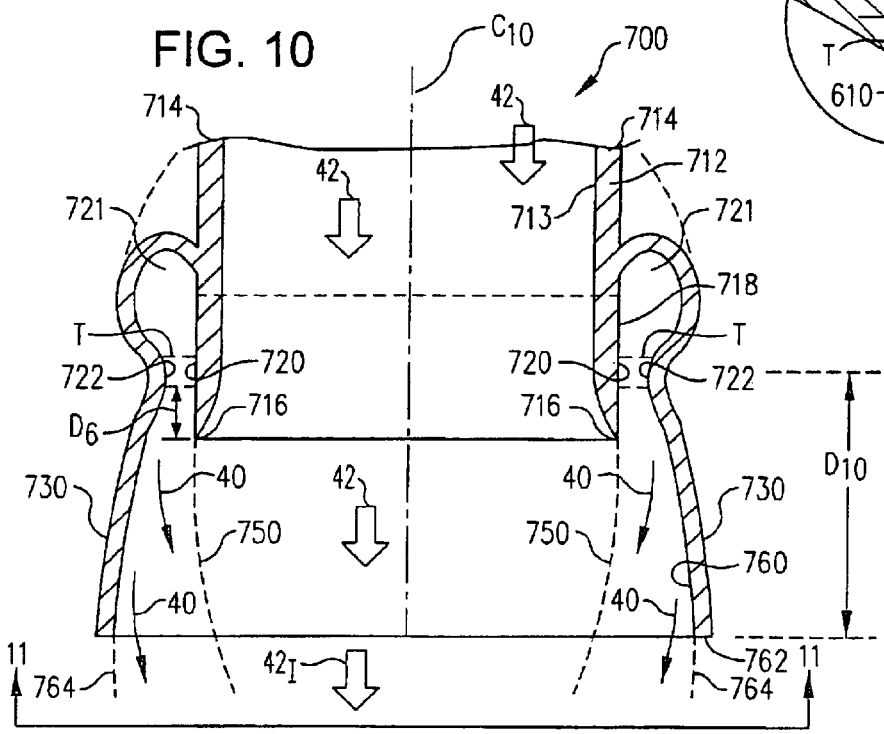

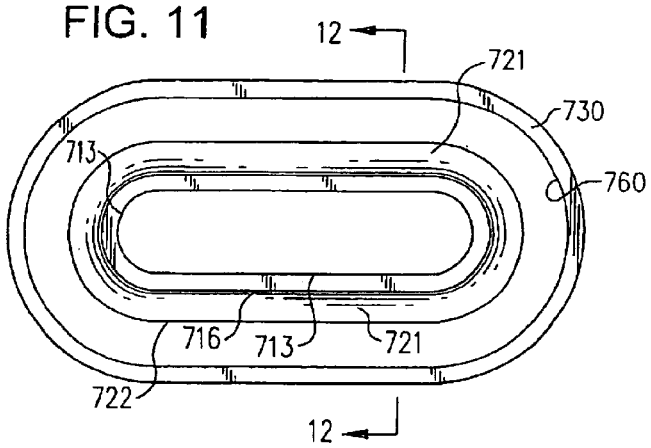
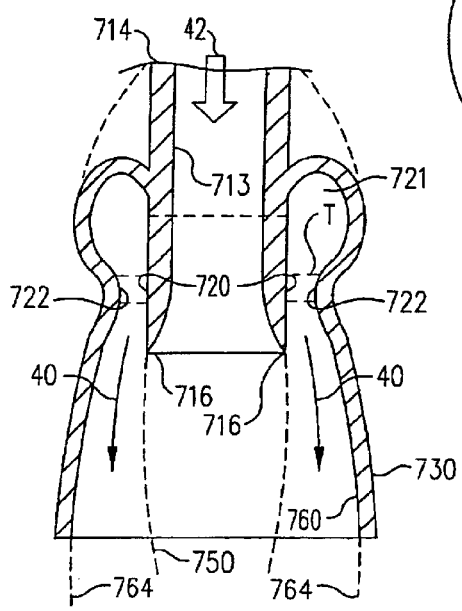
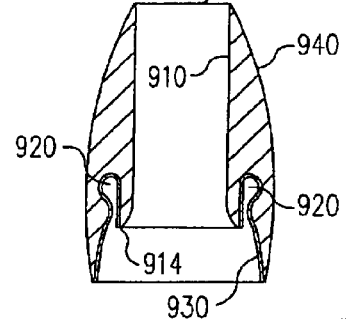
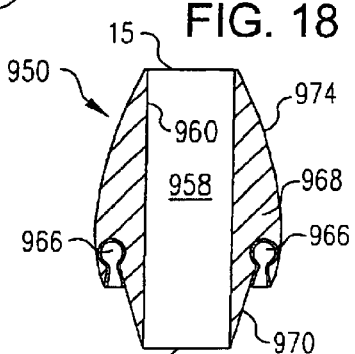
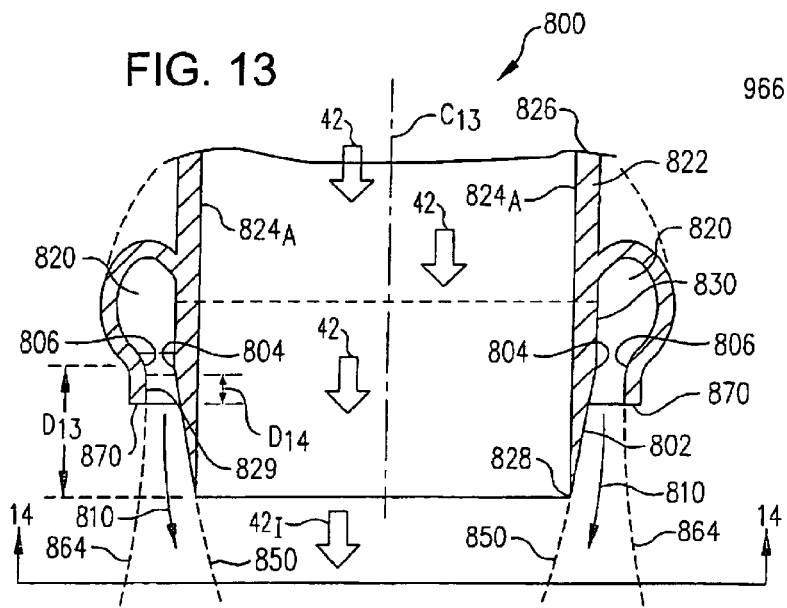

FIG. 14
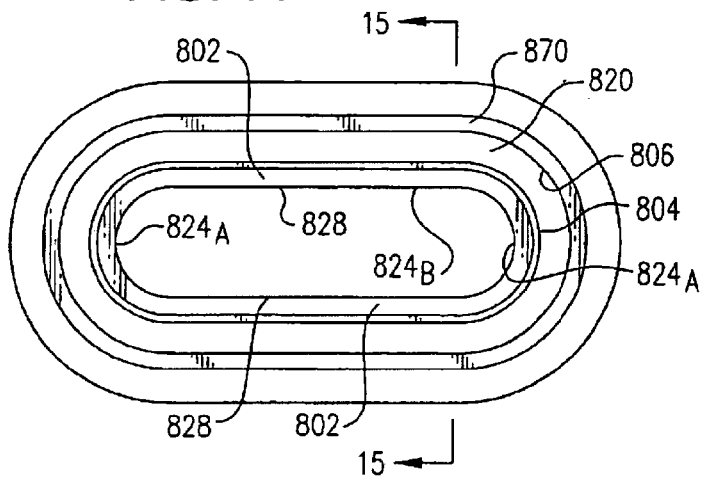
FIG. 15
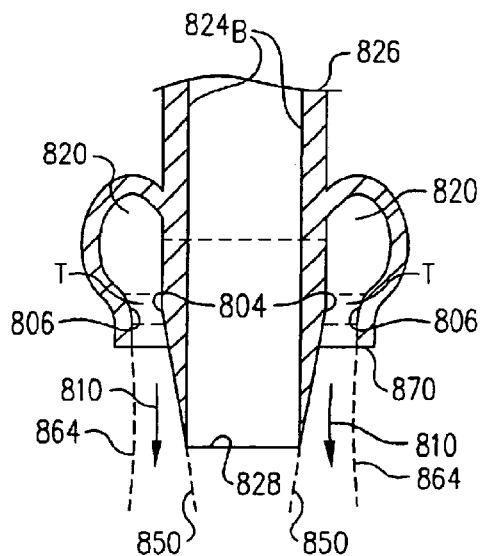
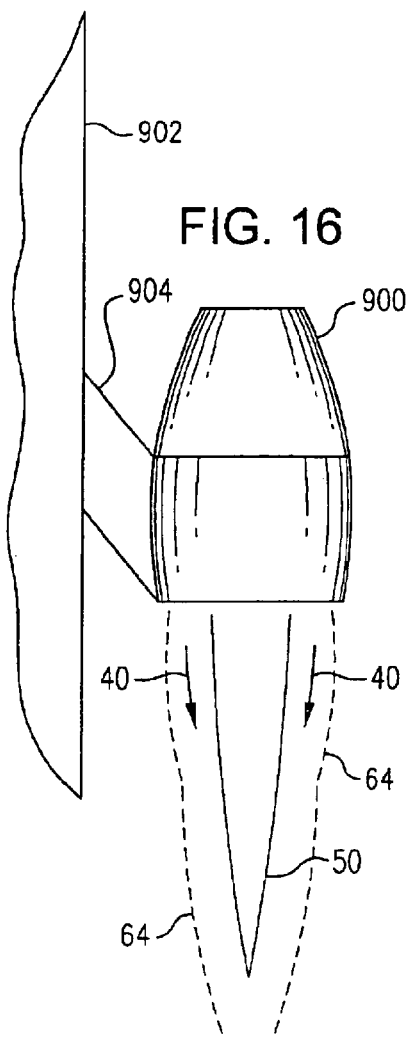
FIG. 16
FIG. 19
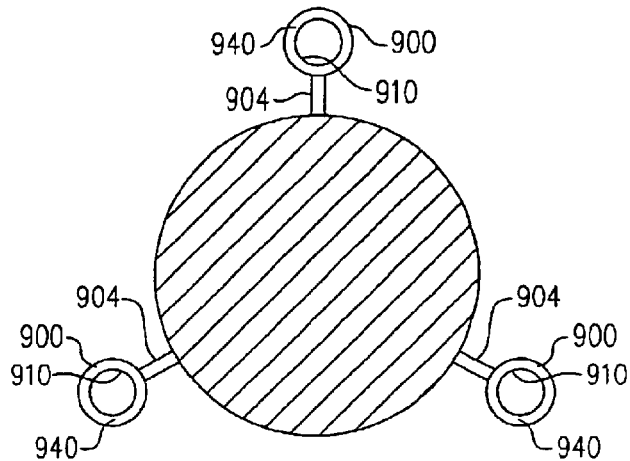

METHOD AND APPARATUS FOR THRUST AUGMENTATION FOR ROCKET NOZZLES

TECHNICAL FIELD

This invention relates to rockets, and more specifically, to methods and apparatus for increasing the effective thrust developed when utilizing rocket motors.

BACKGROUND

In applications for rocket motors, and especially for rocket motors used to lift earth orbit payloads, a primary concern is the amount of thrust provided for a given amount of fuel consumption, i.e, the specific fuel consumption for a given propulsion device. Specifically, in the various nozzles used in propulsion devices that consume chemical fuel stocks, it would be advantageous to increase the momentum transferred to the rocket nozzles from the combusted fuels, in order to increase thrust of the device. And, although some types of steady flow ejectors have been documented and sometimes used to augment the thrust created by a propulsion device by entraining ambient air into the exhaust stream at the nozzle exit, such devices are, for the most part, not particularly efficient. Many prior art thrust augmentors employ a configuration wherein the primary flow injector is surrounded by the secondary flow at the point of injection. Other prior art thrust augmenters rely on the injection of primary flow through the duct wall through holes, a circumferential passage, or a series of passages, in such a fashion as to cause the primary flow to hug the wall between the secondary flow and the passage wall upstream of the nozzle throat. Also, some prior art thrust augmentation injectors use both internal injection and wall injection. However, many of the prior art thrust augmentors required a containment passageway for the fluid mixing and momentum transfer step. So, although various methods and structures have been provided for augmenting thrust in rocket nozzles, in so far as is known to me, conventional designs known heretofore have not provided for induction of secondary flow in a manner wherein the primary thrust flow from the rocket nozzle(s) surrounds an induced secondary flow downstream of the nozzle throat.

In short, conventional thrust augmentation design for propulsion devices, and in particular, for earth or air launched propulsive devices, has not matched the developments in rocket motor design and reliability. For the most part, conventional rocket designs currently in use have ignored the use of a thrust augmentation component. Thus, it would be desirable to provide an improved propulsion device, and in particular, an improved rocket booster design, that utilizes an efficient thrust augmentation device to improve fuel efficiency, and thus, improve payload performance. Alternately, it would be desirable to enable the use of smaller rocket motors, or even fewer rocket stages, or with smaller rockets having smaller motors and smaller fuel and oxidant tanks, than currently necessary in accomplishing the lift of equivalent payloads.

SUMMARY

A novel rocket thrust augmentation system has been developed, and is disclosed herein. Various embodiments described herein include the provision of a ring of exhaust gases from one or more rocket motors located on the rocket launch vehicle. Two flows, a primary flow of hot exhaust gases, and a secondary flow of ambient air, share the same axis, with the secondary flow inside of, and confined by, the primary hot exhaust flow. By virtue of its high velocity, the surrounding primary flow is at lower pressure than the secondary flow of ambient air, which causes the ambient air to flow into and downstream along the secondary airflow duct, and ultimately to be thrown rearward by the primary, hot exhaust gas flow. Consequently, this aspirator action causes a significant and beneficial secondary flow of air through the duct. This secondary flow adds its mass, and thus its momentum, to that of the primary flow, thus increasing the overall thrust of the rocket. Consequently, the thrust provided is much higher than a simple unaugmented rocket. Moreover, when air for augmentation is no longer present, the rocket motor(s) will continue to operate without restriction from the passive thrust augmentation design structure.

In one embodiment, an expansion deflection type outlet nozzle is located peripherally, and preferably circumferentially about a central secondary flow pathway, and the primary flow induces the central secondary flow, thereby enhancing thrust. In yet another embodiment, a plug flow outlet nozzle is provided, and the primary flow is ejected peripherally about the plug outlet, to induce the secondary flow which travels downward and outward while being peripherally confined, at least at the nozzle outlet, by the primary flow of hot exhaust gas. More generally, the present invention involves providing, in a rocket propulsion device, an outlet jet of hot exhaust gases about a centrally located secondary air flow path, so that the hot exhaust gases velocity entrains a secondary air flow, to increase the overall momentum provided for reaction against the rocket motors. In any case, jet nozzle means are supplied with hot exhaust gases, under pressure, and the energized hot gases surround a core of secondary air, resulting in mixing of the primary and secondary flows, adding to the total thrust of the propulsion device.

Compared to prior art rocket designs, the rocket design disclosed herein, utilizing a passive thrust augmentation method, produces much more thrust for a given fuel consumption. This added thrust is in proportion to the density of air in which it operates, and the mass throughput of such air. Consequently, as the rocket gains altitude, the thrust augmentation percentage will drop. This fortunately coincides with the profile of benefit from additional thrust, since as conventional rockets gain altitude they consume massive quantities of fuel with a constant high thrust. Thus, in prior art, conventional rockets, the thrust is constant until the rocket motor is shut down. Of course, the constant high thrust pushing against the decreasing mass (due to fuel and oxidant consumption) of such a conventional rocket results in increasing acceleration or G forces. Such forces rapidly become problematic for manned vehicles, as well as for certain other payloads. With the rocket design provided by the instant invention, thrust augmentation is greatest at the lowest altitudes, where the payload is heaviest, i.e., where the most fuel and oxidant is being carried. Consequently, the decrease in thrust augmentation with increasing altitude, as occurs in rockets designed in accord with the present invention, results in a smaller increase in G forces with fuel consumption when compared to prior art conventional rocket design. Consequently, a rocket designed according to the present invention has improved performance, and is more amenable to manned space flight.

The thrust augmentation system encounters no difficulty upon reaching thin air at high altitudes. That is because the system is technically straightforward, and is preferably implemented with no moving parts. In the new design disclosed herein, the various embodiments are self regulating with altitude and thus achieve good nozzle efficiency with increasing altitude after launch.

Various embodiments of the invention are disclosed in which the mechanical or functional features described above are achieved in disparate physical configurations.

BRIEF DESCRIPTION OF THE DRAWING

In order to enable the reader to attain a more complete appreciation of the invention, and of the novel features and the advantages thereof, attention is directed to the following detailed description when considered in connection with the various figures of the accompanying drawing, wherein:

FIG. 3 shows a generalized rocket schematic that provides details of the use of multiple rocket motors surrounding a central secondary flow path, and wherein the rockets motors are of the type configured for fuel and oxidant flow regulation, so that thrust can be varied about the circumference of the rocket, to control directional stability.

FIG. 6 is a detailed cross sectional view, taken at the area noted as FIG. 6 in FIG. 4, now showing in even greater detail the relatively small primary flow passageways provided to induce secondary flow for thrust augmentation.

FIG. 7 is a cross sectional view of another embodiment for rocket with thrust augmentation, here showing a plurality of rocket motors mounted about the periphery of the lower reaches of a rocket, showing a large secondary air flow passageway, as well as an expansion deflection flow outlet nozzle.

FIG. 8 illustrates a cross-sectional view of yet another test device, this one directed to the test of a plug flow type outlet, wherein the principles of the present invention were evaluated to determine the amount of thrust augmentation achieved by inducing secondary air flow through a central passageway via momentum from high velocity discharge of gas circumferentially to the outlet of the secondary air flow passageway.

FIG. 9 is a detailed cross sectional view, taken at the area noted as FIG. 9 in FIG. 8, now showing in even greater detail the relatively small primary flow passageways for passage of high velocity gas discharge, which are provided to induce secondary flow for thrust augmentation.

FIG. 10 is a simplified cross-sectional view of yet another embodiment for rocket with thrust augmentation, similar to that first shown in FIG. 1 above, but now utilizing a continuous circumferential rocket motor structure with integral expansion deflection outlet nozzle, as well as showing the walls of an oval secondary air flow passageway.

FIG. 11 is a bottom view, taken looking up into the bottom of the apparatus just illustrated in FIG. 10, along line 11—11 of FIG. 10.

FIG. 12 is a simplified cross-sectional view showing the embodiment just illustrated in FIGS. 10 and 11, now showing a cross-section through the minor axis of the rocket, taken along line 12—12 of FIG. 11.

FIG. 13 is a simplified cross-sectional view of yet another embodiment for rocket with thrust augmentation, similar to that first shown in FIG. 2 above, but now utilizing a continuous circumferential rocket motor structure with integral plug flow outlet, as well as showing the walls of a preferably oval large secondary air flow passageway.

FIG. 14 is a bottom view, taken looking up into the bottom of the apparatus just illustrated in FIG. 13, along line 14—14 of FIG. 13.

FIG. 15 is a simplified cross-sectional view showing the embodiment just illustrated in FIGS. 13 and 14, now showing a cross-section through the minor axis of the rocket, taken along line 15—15 of FIG. 14.

FIGS. 16, 17, 18, and 19 show the application of the present invention to strut mounted rocket motors positioned about a payload body being lifted.

In FIG. 16, one rocket motor is shown mounted to a rocket body via a strut; the rocket motor utilizes a central secondary air flow passage for flow of thrust augmenting air that is mixed with hot exhaust gases from the rocket motor.

In FIG. 17, a vertical cross-sectional view is provided of the rocket motor first illustrated in FIG. 16, now showing the presence of a central secondary air flow passageway, one or more rocket motors, and an expansion deflection type outlet nozzle.

FIG. 18 illustrates an alternate embodiment for a rocket motor for attachment to a rocket body as shown in FIGS. 16 and 19, wherein the thrust augmentation type rocket motor is provided with a central secondary air flow passageway, one or more rocket motors mounted circumferentially to the air flow passageway, and a plug flow type outlet.

FIG. 19 illustrates a cross sectional view of a rocket having a plurality of rocket motors attached thereto (here, three motors), each of which utilizes a thrust augmentation design such as one of those just illustrated in FIGS. 17 and 18.

The foregoing figures, being exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the thrust augmentation devices are also shown and briefly described to enable the reader to understand how various optional features may be utilized in order to provide an efficient, reliable, thrust augmentation system for rocket motors.

DETAILED DESCRIPTION

Figure 1:
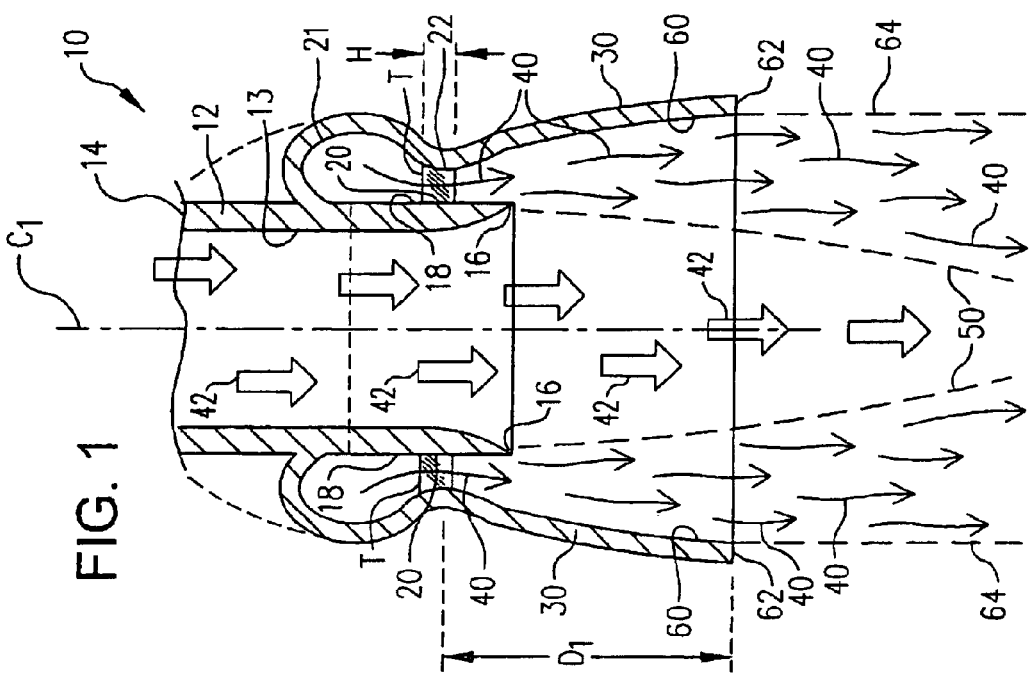
FIG. 1 is a generalized system schematic that shows a rocket having an expansion deflection type nozzle, with a centrally located secondary flow and a preferably annular propulsive device (or annular distribution of propulsive devices) surrounding the secondary flow path.

Attention is directed to FIG. 1, where a generalized system schematic shows the aft portion of a rocket 10 having a centrally located secondary air flow containment casing 12 with an inner wall 13. The casing has an inlet (upstream of reference numeral 14—see FIG. 17 and inlet 15, for example) and an outlet 16 running along a central axis $C_1$. In this FIG. 1, a portion of the outer wall 18 of the casing 12 provides a nozzle internal throat portion 20. For simplicity, and to direct attention to the gas flow path rather than to details of materials of construction, casing 12 is shown here as being of one continuous piece of material. However, in actual practice, the nozzle internal throat portion 20 and the inner wall 13 of the containment casing 12 would normally be made of different materials. The nozzle internal throat portion 20 is located adjacent to (but preferably at least slightly upstream from) the outlet 16 of the secondary air flow containment casing 12. A rocket motor 21 is provided, and a primary flow of energetic hot exhaust gases 40 passes through the rocket throat T (i.e. between nozzle internal throat portion 20 and nozzle exterior throat portion 22) and leaves the rocket motor 21. The nozzle internal throat portion 20 is positioned slightly upstream of, and circumferential to (or peripheral to, depending on the surface shape provided) the outlet 16 of the secondary airflow casing 12. An outlet nozzle 30, having a preselected contour such as the expansion deflection profile shown in FIG. 1, is provided. The outlet nozzle 30 extends for a preselected distance $D_1$ downstream from the pinch point provided between nozzle interior throat portion 20 and nozzle exterior throat portion 22. An energetic hot gas stream primary flow indicated by reference arrows 40 that results from the combustion in rocket motor 21 of a fuel and an oxidant (see FIGS. 3 and 7, for example) is discharged through the passageway between the rocket nozzle exterior throat portion 22 and the nozzle interior throat portion 20. The pinch point length H of the throat T, as well as the exact shape of the nozzle exterior throat portion 22 and of the nozzle interior throat portion 20 can be varied as appropriate for a given rocket motor service and rocket design. Circumfluently, the outlet flow pathway between nozzle exterior throat portion 22 and nozzle interior throat portion 20 may be circumferential, in the case of circular or generally curvilinear designs, or may otherwise peripherally surround the casing 12 in case of other shapes thereof.

The secondary atmospheric gas stream as indicated by reference arrows 42, which has passed through casing 12, then mixes with the primary flow 40. Mixing occurs along the interior free jet boundary 50, which, as depicted, substantially is in the shape of an upwardly opening cone; however, this shape will vary with altitude. Upon mixing, momentum is added, and thus additional reaction thrust is achieved from rocket 10. The energetic hot gas stream primary flow indicated by reference arrows 40 runs along the interior wall 60 of outlet nozzle 30, and after the downstream end 62 of outlet nozzle 30, an exterior free jet boundary 64 forms at the radial distal periphery of the hot gas exhaust stream 40.

Figure 2:
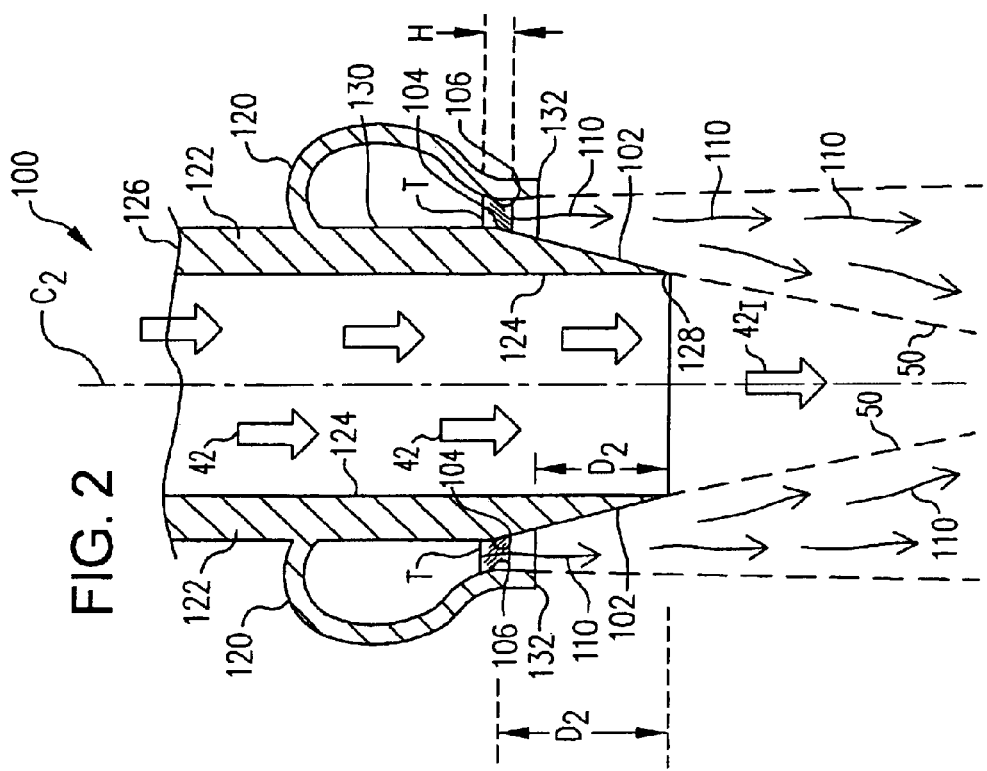
FIG. 2 shows a generalized system schematic that shows a rocket having a plug flow type outlet nozzle, also having a centrally located secondary flow and a preferably annular (distribution) of propulsive device(s) surrounding the secondary flow path.

Turning now to FIG. 2, rocket 100 is shown with a plug flow shaped outlet nozzle 102. Nozzle interior throat portion 104 and the nozzle exterior throat portion 106 cooperate to define a pathway for hot energetic exhaust gases 110 to escape outward from rocket motor 120. That pathway may be circumferential, in the case of circular or generally curvilinear designs, or may otherwise peripherally surround the secondary containment casing 122 in case of other shapes. Rocket 100 has a centrally located secondary air flow containment casing 122 with an inner wall 124. The casing has an inlet (upstream of reference numeral 126—see FIG. 17 and inlet 15, for example) and an outlet 128 and runs along a central axis $C_2$. As indicated in FIG. 2, a portion of the outer wall 130 of the casing 122 provides a nozzle interior throat portion 104. For simplicity, and to direct attention to the gas flow path rather than to details of materials of construction, casing 122 is shown here as being of one continuous piece of material. However, in actual practice, the outer wall 130 and nozzle interior throat portion 104, as well as the inner wall 124 of the containment casing 122 would normally be made of different materials. As indicated in this embodiment, the nozzle interior throat portion 104 is located adjacent to (but preferably at least slightly upstream from) the outlet 128 of the secondary air flow containment casing 122. The flow of primary energetic hot exhaust gases leaves the rocket motor 120 through the throat T, between nozzle interior throat portion 104 and nozzle exterior throat portion 106. The nozzle exterior throat portion 106 is positioned upstream of, and circumferential to, the outlet 128 of the secondary airflow containment casing 122. Note that although in this embodiment a single rocket motor is described, as will be further explained hereinbelow, it is also possible to utilize multiple rocket motors, each having its own throat, which will be circular in one embodiment thereof, and the use of the term interior throat portion 104 is merely provided for convenience with respect to the present embodiment of a circumfluent type rocket motor. An outlet nozzle 102, having a preselected contour such as the plug nozzle profile indicated in FIG. 2 is provided. The outlet nozzle 102 extends for a preselected distance $D_2$ downstream from the rocket primarily flow outlet 132. That portion 42, of the secondary atmospheric gas stream 42 which has completely passed through the secondary airflow containment casing 122 then mixes with the primary flow hot exhaust gases 110. Mixing occurs along the interior free jet boundary 50, which, as depicted, substantially is in the shape of an upwardly opening cone; however, such shape will vary with thrust and altitude. Upon mixing, momentum is added, and thus additional thrust is added to the rocket performance.

Attention is now directed to FIG. 3, where the aft portion of a novel rocket 200 is illustrated. This design is shown with a plug flow shaped outlet nozzle 202. Nozzle interior throat portion 204 and the nozzle exterior throat portion 206 cooperate to define an exit pathway for hot energetic exhaust gases 210 to escape outward from each rocket motor 220. A plurality of rocket motors in a series $220_1$, $220_2$, $220_3$, through $220_x$, (where x is a positive integer) are provided to peripherally or circumferentially (depending on shape) surround the secondary air flow containment casing 222. In such an embodiment, the nozzle interior throat portion 204 and the nozzle interior throat portion 206 are in reality just indications of opposing portions of a single circular throat T. Rocket 200 has a centrally located secondary air flow containment casing 222 with an inner wall 224. The casing has an inlet (upstream of reference numeral 226—see FIG. 17 and inlet 15, for example) and an outlet 228 and runs along a central axis $C_3$. A portion of the outer wall 230 of the outlet nozzle 202 may provide the nozzle interior throat portion 204, either separately or integrally with a particular rocket motor $220_x$. As indicated in this embodiment, the nozzle interior throat portion 204 is located adjacent to (but preferably at least slightly upstream from) the outlet 228 of the secondary air flow containment casing 222. The flow of primary energetic hot exhaust gases escapes from combustion chamber(s) of the one or more rocket motors 220 through the throats T. The throats T are preferably positioned upstream of, and peripherally to (or circumferential to), the outlet 228 of the secondary airflow casing 222. The casing outlet nozzle 202 extends for a preselected distance $D_3$ downstream from the throats T. That portion $42_I$ of the secondary atmospheric gas stream 42 which has passed through the secondary airflow containment casing 222 then mixes with the primary flow hot exhaust gases 210. As earlier noted, fluid mixing occurs along the interior free jet boundary 50, which, as depicted, is substantially in the shape of an upwardly opening cone; however this shape will vary with rocket motor thrust output and with altitude. Upon mixing, momentum is added, and thus additional thrust is added to the rocket motor performance.

Fuel 250 and oxidant 260 lines provide fuel 252 and oxidant 262, respectively, to rocket motors 220$_x$. In this embodiment, also provided are regulating valve 254 on the fuel line 250, and regulating valve 264 on the oxidant supply line 260, so that either or both fuel 252 and/or oxidant 262 supply can be controlled. With regulation on either fuel supply lines 250 or oxidant supply lines 260, a directional control device or guidance system 270 can be provided that individually controls the supply of fuel 252 and oxidant 262 to one or more of the rocket motors in the plurality of rocket motors 220$_1$, 220$_2$, 220$_3$, 220$_x$. In this manner, the guidance system 270 can be used to control the regulating valves 252 or 262 on the fuel 250 and/or oxidant 260 supply lines, in order to control the amount of thrust about the perimeter of the rocket 200, and thus control the direction of the rocket 200. Thus, stability inputs as appropriate can be easily provided to achieve desired orientation and trajectory.

Figure 4:
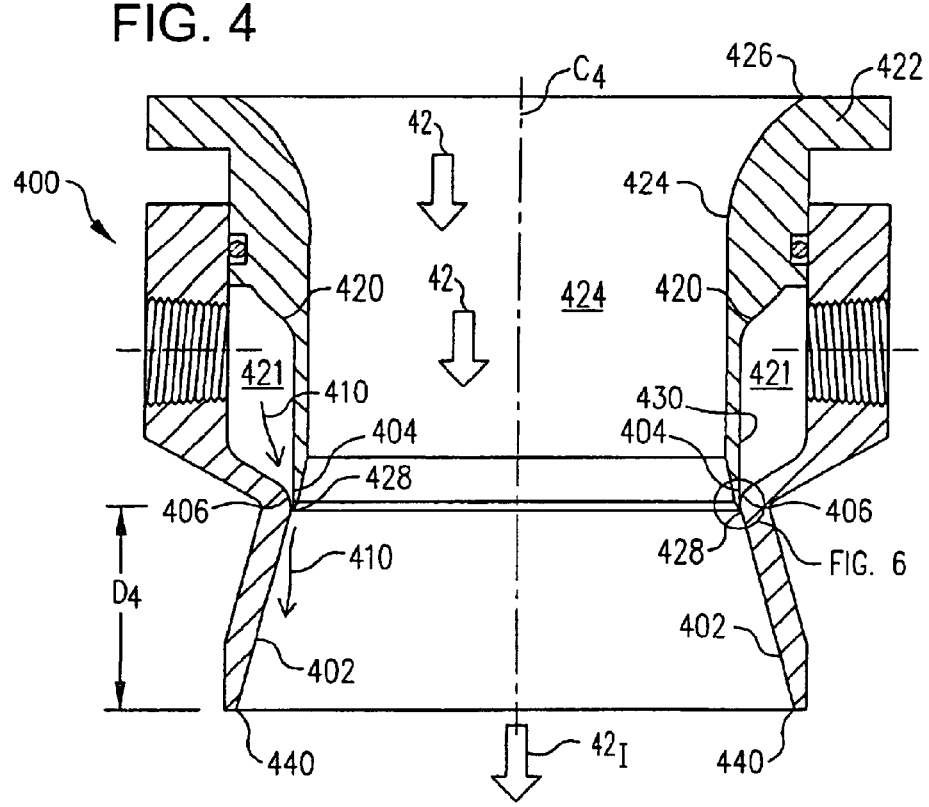
FIG. 4 illustrates a cross-sectional view of one test device wherein the principles of the present invention were evaluated to determine the amount of thrust augmentation achieved.
Figure 5:
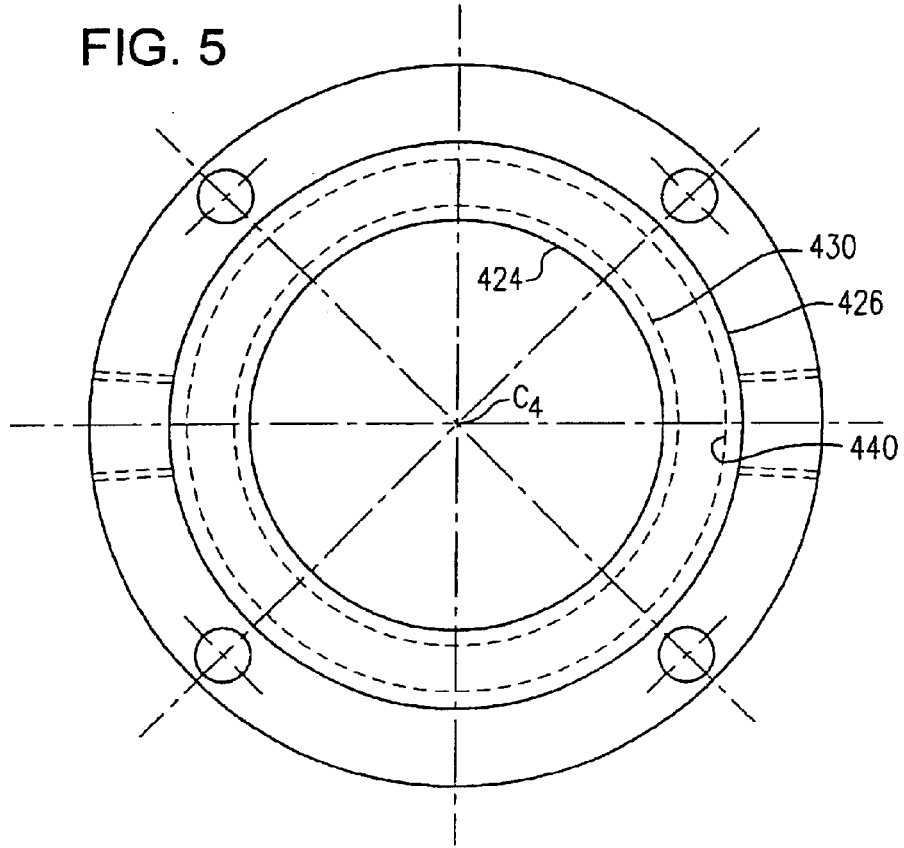
FIG. 5 is a top view of the test device just illustrated in FIG. 4, now showing the large central space for secondary flow, and the small passageways for primary flow alongside of the expansion flow nozzle, where high speed primary jets are utilized to induce the secondary flow to augment thrust.

Turning now to FIGS. 4, 5, and 6, one exemplary embodiment of my test apparatus for evaluating the amount of thrust achievable with the novel thrust augmentation designs provided herein is disclosed. FIG. 4 provides a cross-sectional view, and FIG. 5 provides a top view. Details of the peripheral gap G that provides the induction jet outlet are shown in FIG. 6. In the design illustrated in these figures, a simulated rocket body 400 is shown with an expansion deflection type outlet nozzle 402. As better seen in FIG. 6, a nozzle interior throat portion 404 and the nozzle exterior throat portion 406 cooperate to define a substantially circumferential pathway having a gap G therebetween. Although only cold gases were utilized in this test model, in an actual rocket motor, hot energetic exhaust gases 410 would escape outward from rocket motor 420 combustion chamber 421. Rocket body 400 has a centrally located secondary air flow containment casing 422 with an inner wall 424. The casing has an inlet 426 and an outlet 428 and runs along a central axis $C_4$. As indicated in FIG. 6, a portion of the outer wall 430 of the secondary air flow containment casing 422 provides the nozzle interior throat portion 404. As indicated in this embodiment, the nozzle interior throat portion 404 is located adjacent to (but preferably at least slightly upstream from) the outlet 428 of the secondary air flow containment casing 422. The rocket motor outlet 432 is positioned adjacent of, and circumferential to, the outlet 428 of the secondary airflow containment casing 422. An outlet nozzle 402, having a preselected contour such as the expansion deflection profile indicated in FIGS. 4, 5, and 6, is provided. The outlet nozzle 402 extends for a preselected distance $D_4$ downstream from the rocket outlet 406 to an outlet end 440. That portion 42$_I$ of the secondary atmospheric gas stream 42 which has passed through secondary airflow containment casing 422 then mixes with the primary flow exhaust gases 410. Mixing occurs as already described above. Upon mixing, momentum is added, and thus additional thrust is added to the rocket performance. In one test of this design, I have found that the amount of thrust augmentation is up to as much as two hundred and sixty four percent.

In a different, plug flow type embodiment, the test apparatus for which is now shown in FIG. 8 (similar in configuration to the rocket motor shown in FIG. 2 above), the amount of thrust augmentation is up to as much as one hundred and thirty five percent, as evaluated in a non-combustion test environment. FIG. 8 illustrates a cross-sectional view of a test device used that is directed to the test of a plug flow type outlet, wherein the principles of the present invention were evaluated to determine the amount of thrust augmentation achieved by inducing secondary air flow through a central passageway via momentum from high velocity discharge of gas circumferentially to the outlet of the secondary air flow passageway. In this design, rocket body 600 is provided with a plug flow shaped outlet nozzle 602. As more clearly seen in FIG. 9, nozzle interior throat portion 604 and the nozzle exterior throat portion 606 cooperate to define an exit pathway for hot energetic exhaust gases 610 to escape outward from the rocket motor 620. One or more rocket motors 620, such as a series of motors 620$_1$, 620$_2$, 620$_3$, through 620$_x$, (where x is a positive integer) are provided to peripherally or circumferentially (depending on shape) surround the secondary air flow containment casing 622. Rocket 600 has a centrally located secondary air flow containment casing 622 with an inner wall 624. The casing has an inlet 626 and an outlet 628 and runs along a central axis $C_5$. A portion of the outer wall 630 of the outlet nozzle 602 may provide the nozzle interior throat portion 604, either separately or integrally with a particular rocket motor 620$_x$. As indicated in this embodiment, the nozzle interior throat portion 604 is located adjacent to (but as shown upstream from) the outlet 628 of the secondary air flow containment casing 622. The flow of primary energetic hot exhaust gases escapes from combustion chamber of the rocket motor 620$_x$ through the throat T between nozzle interior throat portion 604 and the nozzle exterior throat portion 606. The throat T is preferably positioned upstream of, and peripherally to (or circumferential to), the outlet 628 of the secondary airflow casing 622. The casing outlet nozzle 602 extends for a preselected distance $D_5$ downstream from the throat T. That portion 42$_I$ of the secondary atmospheric gas stream 42 which has passed through the secondary airflow containment casing 622 then mixes with the primary flow hot exhaust gases 610. As earlier noted, fluid mixing occurs along the interior free jet boundary 50, which, as earlier depicted (see FIG. 3), is substantially in the shape of an upwardly opening cone; however this shape will vary with rocket motor thrust output and with altitude. Upon mixing, momentum is added, and thus additional thrust is added to the rocket motor performance.

Attention is directed to FIG. 10, where a simplified cross-sectional view of yet another embodiment for rocket with thrust augmentation is provided, similar to that first shown in FIG. 1 above, but now utilizing a continuous circumferential rocket motor structure with integral expansion outlet nozzle, as well as showing the walls of a generally oval secondary air flow passageway. FIG. 10 shows the aft portion of a rocket 700 having a centrally located secondary air flow containment casing 712 with an inner wall 713. The casing has an inlet (upstream of reference numeral 714—see FIG. 17 and inlet 15, for example) and an outlet 716 running along a central axis $C_{10}$. In this FIG. 10, a portion of the outer wall 718 of the casing 712 provides a nozzle internal throat portion 720. The nozzle internal throat portion 720 is located adjacent to (but preferably at least slightly upstream from) the outlet 716 of the secondary air flow containment casing 712. A rocket motor 721 is provided, and a primary flow of energetic hot exhaust gases 40 passes through the rocket throat T (i.e. between nozzle internal throat portion 720 and nozzle exterior throat portion 722) and leaves the rocket motor 721. The nozzle internal throat portion 720 is positioned slightly upstream of, and peripheral to the outlet 716 of the secondary airflow casing 712. An outlet nozzle 730, having a preselected contour such as the expansion deflection profile shown in FIG. 10, is provided. The outlet nozzle 730 includes a section of length $D_6$ which is divergent, for the purpose of allowing the primary flow to go supersonic before it contacts the secondary flow. The outlet nozzle 730 extends for a preselected distance $D_{10}$ downstream from the pinch point provided between nozzle interior throat portion 720 and nozzle exterior throat portion 722. An energetic hot gas stream primary flow indicated by reference arrows 40 that results from the combustion in rocket motor 721 of a fuel and an oxidant (see FIGS. 3 and 7, for example) is discharged through the passageway between the rocket nozzle exterior throat portion 722 and the nozzle interior throat portion 720. The pinch point length H of the throat T, as well as the exact shape of the nozzle exterior throat portion 722 and of the nozzle interior throat portion 720 can be varied as appropriate for a given rocket motor service and rocket design. The secondary atmospheric gas stream as indicated by reference arrows $42_I$, which has passed through casing 712, then mixes with the primary flow 40. Mixing occurs along the interior free jet boundary 750, which in this embodiment, would be different than earlier depicted, since a oval shape should be expected, particularly in view of the outlet shape as indicated by FIG. 11. In any event, upon mixing, momentum is added, and thus additional reaction thrust is achieved from rocket 710. The energetic hot gas stream primary flow indicated by reference arrows 40 runs along the interior wall 760 of outlet nozzle 730, and after the downstream end 762 of outlet nozzle 730, an exterior free jet boundary 764 forms at the radial distal periphery of the hot gas exhaust stream 40, generally as set forth above. For purposes of testing, it was unnecessary to utilize hot gas or utilize multiple motors in the devices illustrated in FIGS. 4 and 8. However, by use of suitable gas flow parameters, the principles of the present invention were suitably confirmed.

As seen in FIG. 10, but better appreciated from further comparison with FIGS. 11 and 12, in this embodiment, a continuous circumferential rocket motor structure 721 is provided, with a preferably integral expansion deflection outlet nozzle 730. Note that the walls of the secondary airflow containment passageway 722 are generally oval in shape, as well as the outlet nozzle 730, as well as the generally oval secondary air flow passageway defined by containment walls 713. In the bottom view provided by FIG. 11, both a major and a minor axis are shown.

Further definition of the unique shape provided by this embodiment is illustrated in FIG. 12, which shows the embodiment just illustrated in FIGS. 10 and 11, but now showing a cross-section through the minor axis of the rocket taken along line 12—12 of FIG. 11, (as contrasted with the cross-section of FIG. 10 taken along the major axis of the rocket).

Turning now to FIGS. 13, 14, and 15, these are similar to those embodiments just shown in FIGS. 10, 11, and 12, but yet another embodiment for rocket with thrust augmentation is illustrated, utilizing a continuous circumferential rocket motor structure with integral plug flow outlet, as well as providing an oval secondary air flow passageway. FIG. 14 is a bottom view, taken looking up into the bottom of the apparatus illustrated in FIG. 13, along line 14—14 of FIG. 13. FIG. 15 shows the minor axis of this embodiment (as contrasted to the major axis shown in FIG. 13), taken along line 15—15 of FIG. 14. In FIG. 13, the aft portion of rocket 800 is shown with a plug flow shaped outlet nozzle 802. Nozzle interior throat portion 804 and the nozzle exterior throat portion 806 cooperate to define a pathway for hot energetic exhaust gases 810 to escape outward from rocket motor 820. That pathway peripherally surrounds the generally oval shaped secondary containment casing 822. Rocket 800 has a centrally located secondary air flow containment casing 822 with an inner wall 824. As illustrated in FIGS. 13, 14, and 15, wall 828 has opposing ends along a major axis, each depicted as walls $828_A$, and opposing sides along a minor axis, each depicted as $828_B$. The casing has an inlet (upstream of reference numeral 826—see FIG. 17 and inlet 15, for example) and an outlet 828 and runs along a central axis $C_{13}$. As indicated in FIG. 13, a portion of the outer wall 830 of the casing 822 provides a nozzle interior throat portion 804. For simplicity, and to direct attention to the gas flow path rather than to details of materials of construction, casing 822 is shown here as being of one continuous piece of material. However, in actual practice, the nozzle interior throat portion 804 and the outer wall 830 of the containment casing 822 would normally be made of different, and some embodiments, separable materials As indicated in this embodiment, the nozzle interior throat portion 804 is located adjacent to (but preferably at least slightly upstream from) the outlet 828 of the secondary air flow containment casing 822. The flow of primary energetic hot exhaust gases leaves the rocket motor 820 through the throat T, between nozzle interior throat portion 804 and nozzle exterior throat portion 806. The outlet 829 includes a section of length $D_{14}$ which is divergent, for the purpose of allowing the primary flow to go supersonic before it contacts the secondary flow. The nozzle exterior throat portion 806 is positioned upstream of the outlet 828 of the secondary airflow containment casing 822. An outlet nozzle 802, having a preselected contour such as the plug nozzle profile indicated in FIG. 13 is provided. The outlet nozzle 802 extends for a preselected distance $D_{13}$ downstream from the rocket throat T. That portion 42, (the induced airflow) of the secondary atmospheric gas stream 42 which has completely passed through the secondary airflow containment casing 822 then mixes with the primary flow hot exhaust gases 810. Mixing occurs along the interior free jet boundary 850, which, as depicted, substantially is in the shape of an oval of decreasing cross section; downstream; however, such shape will vary with thrust and altitude. An exterior free jet boundary 864 forms at the outer periphery of the hot gas exhaust stream 810, generally as set forth above. Upon mixing, momentum is added, and thus additional thrust is added to the rocket performance.

Attention is now directed to FIGS. 16 through 19, where the use of externally mounted rocket motors is illustrated. On one embodiment, such a mounting technique may be enabled by affixing thrust augmented rocket motors 900 to rocket 902 via way of struts 904, as depicted in FIG. 16. Note the mixing of the primary hot exhaust gas stream 40 along an inner free jet boundary 50, and the contact of the hot exhaust gas stream with an outer free jet boundary 64. As depicted in FIGS. 16, 17, and 19, a thrust augmented rocket motor assembly 900 having a secondary airflow containment passageway defined by inner sidewall 910 can be advantageously utilized. Secondary airflow containment passageway has an inlet 15 and an outlet 914. In this configuration, an expansion deflection type nozzle 930 may be used, as shown in FIG. 17. In such a configuration, the details are fundamentally as earlier described, with respect to fuel and oxidant supply; here, the same may be provided via struts 904. Also, the details as to the rocket motors 920, and the outlet nozzle 930, as well as mixing, etc, along an inner free jet boundary 50, are fundamentally as set forth in FIG. 10. For example, see details as set forth in conjunction with FIG. 10 regarding the rocket motor 721 throat T and accompanying hot gas stream 40. However, in the externally mounted configuration illustrated in FIGS. 16 through 19, the rocket motor assembly 900 is provided in a compact, aerodynamic pod 940 that efficiently and preferably integrally supports and encloses rocket motors 920 and the outlet nozzle 930.

FIG. 18 illustrates an alternate embodiment for a rocket motor for attachment to a rocket body as shown in FIGS. 16 and 19, wherein the thrust augmentation type rocket motor assembly 950 is provided with a central secondary air flow containment passageway 958 defined by inner edge wall 960. The secondary air flow containment passageway has an inlet 15 and an outlet 962. One or more rocket motors 966 are mounted circumferentially in support structure 968 adjacent to the central secondary air flow containment passageway 958. A plug flow type nozzle 970 is provided. This configuration and its operation is thus similar to the plug flow nozzle 102 and rocket motors 120 depicted in FIG. 2 above. An aerodynamic outer surface 974 is provided for support structure 968 of rocket motor assembly 950.

The techniques just described herein can be used in a method of augmenting the thrust of a rocket passing through atmospheric gas. To practice the method, the first step is providing a rocket body having a secondary air flow containment casing along a central axis (at least at or near the exhaust end), with the casing having an inlet and an outlet. However, at the inlet end of the casing, it is not necessary (although it is preferred) that the casing central axis be aligned with the radial center of thrust from the rocket motors. Next, rocket motor(s) are provided wherein each has a throat portion, and the throat portion(s) should be positioned upstream of, and substantially circumferential to, the outlet of the secondary airflow casing. The next step in practicing this method is to provide a nozzle throat portion located in juxtaposition to the rocket motor outlet(s). The nozzle throat portion is located along the flow path just prior to the outlet of the secondary air flow containment casing outlet. Then, an outlet nozzle must be provided. The outlet nozzle should have a preselected contour based on the design flows and velocities, and the outlet nozzle should extend for a preselected distance downstream from the rocket motor outlet(s). The nozzle throat portion discharges a primary, hot exhaust gas flow. The primary hot exhaust gas flow induces a secondary, atmospheric gas to pass through the casing. Downstream from the outlet nozzle, the secondary atmospheric flow mixes with the primary flow, thereby augmenting momentum and thus augmenting thrust of the rocket.

As set forth above, this method is applicable to either expansion deflection type or to plug flow type outlet nozzles.

It is to be appreciated that the various aspects and embodiments of the structures for rocket thrust augmentation described herein are an important improvement in the state of the art, especially for boosting payloads into earth orbit. Although only a few exemplary embodiments have been described in detail, various details are sufficiently set forth in the drawings and in the specification provided herein to enable one of ordinary skill in the art to make and use the invention(s), which need not be further described by additional writing in this detailed description. The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. A rocket suitable for use in the presence of air, said rocket comprising:
   (a) a secondary air flow containment casing having an inlet and an outlet;
   (b) a rocket motor adapted to burn a fuel and an oxidant to produce a hot exhaust primary gas flow, said rocket motor having (i) a nozzle interior throat portion, said nozzle interior throat portion located upstream of, and peripheral to, said outlet of said secondary air flow containment casing outlet, and (ii), a nozzle exterior throat portion, said nozzle exterior throat portion positioned upstream of, and peripheral to, said outlet of said secondary airflow containment casing, wherein (iii) said nozzle exterior throat portion and said nozzle interior throat portion are adapted to discharge therebetween said hot exhaust primary gas flow from said rocket motor;
   (c) an outlet nozzle, said outlet nozzle having a preselected contour, said outlet nozzle extending for a preselected distance downstream from said nozzle exterior throat portion;
   (d) so that said hot exhaust primary gas flow induces said secondary air flow through said secondary air flow containment casing, thereby causing said secondary air flow from said secondary air flow containment casing to mix with said hot exhaust primary gas flow so as increase total momentum of gases exiting said rocket.

2. The apparatus as set forth in claim 1, wherein said nozzle interior throat portion and said nozzle exterior throat portion form a narrow passage of preselected gap width.

3. The apparatus as set forth in claim 1, wherein said nozzle exterior throat portion has affixed thereto, or integrally provided therewith, an expansion-deflection nozzle.

4. A thrust augmented rocket suitable for use in atmospheric air, said rocket comprising:
   (a) a secondary air flow containment casing having an inlet and an outlet;
   (b) a plurality of rocket motors each having thrust outlets, said thrust outlets positioned upstream of, and peripheral to, said outlet of said secondary airflow containment casing;
   (c) each of said thrust outlets of said rocket motors adapted to discharge a primary, hot exhaust gas flow therefrom, to (i) provide primary thrust, (ii) and to induce a secondary atmospheric gas to pass through said secondary air flow containment casing, and (iii) mixing said hot exhaust gas flow and said induced flow downstream of said secondary air flow containment casing to augment said primary thrust.

5. A rocket suitable for use in the presence of air, said rocket comprising:
   (a) a secondary air flow containment casing having an inlet and an outlet;
   (b) a rocket motor adapted to burn a fuel and an oxidant to produce a hot exhaust primary gas flow, said rocket motor having
      (i) a nozzle interior throat portion, said nozzle interior throat portion located upstream of, and peripheral to, said outlet of said secondary air flow containment casing outlet, and (ii), a nozzle exterior throat portion, said nozzle exterior throat portion positioned upstream of, and peripheral to, said outlet of said secondary airflow containment casing, wherein (iii) said nozzle exterior throat portion and said nozzle interior throat portion are adapted to discharge therebetween said hot exhaust primary gas flow from said rocket motor;

(c) an outlet nozzle, said outlet nozzle having a preselected contour, said outlet nozzle extending for a preselected distance downstream from said nozzle interior throat portion;

(d) so that said hot exhaust primary gas flow induces said secondary air flow through said secondary air flow containment casing, thereby causing said secondary air flow from said secondary air flow containment casing to mix with said hot exhaust primary gas flow so as increase total momentum of gases exiting said rocket.

6. The apparatus as set forth in claim 5, wherein said nozzle interior throat portion and said nozzle exterior throat portion form a narrow passage of preselected gap width.

7. The apparatus as set forth in claim 5, wherein said nozzle interior throat portion has affixed thereto, or integrally provided therewith, a plug flow outlet nozzle.

8. The apparatus as set forth in claim 1, or claim 4, or claim 5, further comprising fuel and oxidant supply lines to each of said one or more rocket motors.

9. The apparatus as set forth in claim 8, further comprising a regulating valve on said fuel supply line, so that fuel supply control can be controlled to said one or more rocket motors.

10. The apparatus as set forth in claim 8, further comprising a regulating valve on said oxidant supply line, so that supply of oxidant can be controlled to said one or more rocket motors.

11. The apparatus as set forth in claim 9, wherein said rocket further comprises a directional control device, and wherein said directional control device is utilized to control said regulating valves on said fuel or on said oxidant supply lines, in order to control the direction of said rocket.

12. The apparatus as set forth in claim 1, or claim 5, wherein the amount of thrust augmentation is up to as much as one hundred thirty five percent.

13. The apparatus as set forth in claim 1, or claim 5, wherein the amount of thrust augmentation is up to as much as two hundred sixty four percent.

14. A method of augmenting the thrust of a rocket passing through atmospheric gas, said method comprising:

(a) providing a rocket body having a secondary air flow containment casing along a central axis, said casing having an inlet and an outlet;

(b) providing one or more rocket motors each having a nozzle throat portion, said nozzle throat portion of each of said one or more rocket motors positioned upstream of, and peripheral to, said outlet of said secondary airflow casing;

(c) providing an outlet nozzle, said outlet nozzle having a preselected contour, said outlet nozzle extending for a preselected distance downstream from each of said one or more nozzle throat portions;

(d) discharging from said one or more nozzle throat portions a primary, hot exhaust gas flow, said primary hot exhaust gas flow inducing a secondary, atmospheric gas passing through said secondary airflow containment casing to mix with said primary flow, thereby augmenting momentum and thus augmenting thrust of said rocket.

15. The method as set forth in claim 14, wherein each one of said rocket motors comprises:

(a) a nozzle interior throat portion, said nozzle interior throat portion located adjacent said outlet of said secondary air flow containment casing outlet; and (b) a nozzle exterior throat portion, said exterior throat portion positioned upstream of, and peripheral to, said outlet of said secondary airflow casing.

16. The method as set forth in claim 15, wherein said nozzle exterior throat portion has affixed thereto, or integrally provided therewith, an expansion-deflection nozzle.

17. The method as set forth in claim 15, wherein said nozzle exterior throat portion has affixed thereto, or integrally provided therewith, a plug nozzle.

18. The method as set forth in claim 15, wherein said nozzle interior throat portion and said nozzle exterior throat portion form a narrow passage of preselected gap width.

19. A rocket suitable for use in the presence of air, said rocket comprising:

(a) a rocket body, (b) plurality of rocket motor assemblies affixed to said rocket body, wherein each of said rocket motor assemblies comprise (i) a secondary air flow containment casing having an inlet and an outlet, (ii) a rocket motor adapted to burn a fuel and an oxidant to produce a hot exhaust primary gas flow, said rocket motor having (A) a nozzle interior throat portion, said nozzle interior throat portion located upstream of, and peripheral to, said outlet of said secondary air flow containment casing outlet, and (B), a nozzle exterior throat portion, said nozzle exterior throat portion positioned upstream of, and peripheral to, said outlet of said secondary airflow containment casing, wherein (C) said nozzle exterior throat portion and said nozzle interior throat portion are adapted to discharge therebetween said hot exhaust primary gas flow from said rocket motor, (iii) an outlet nozzle, said outlet nozzle having a preselected contour, said outlet nozzle extending for a preselected distance downstream from said nozzle exterior throat portion, (iv) so that said hot exhaust primary gas flow induces said secondary air flow through said secondary air flow containment casing, thereby causing said secondary air flow from said secondary air flow containment casing to mix with said hot exhaust primary gas flow so as increase total momentum of gases exiting said rocket.

20. The apparatus as set forth in claim 19, wherein three or more rocket motor assemblies are affixed to said rocket body.

21. The apparatus as set forth in claim 19, wherein each of said rocket motor assemblies further comprises an expansion outlet nozzle.

22. The apparatus as set forth in claim 19, wherein each of said rocket motor assemblies further comprises a plug flow outlet nozzle.

23. The apparatus as set forth in claim 19, further comprising fuel and oxidant supply lines from said rocket body to each one of said one or more of said rocket motors assemblies.

24. The apparatus as set forth in claim 23, further comprising a regulating valve on said fuel supply line, so that fuel supply control can be controlled to said one or more rocket motors.

25. The apparatus as set forth in claim 23, further comprising a regulating valve on said oxidant supply line, so that supply of oxidant can be controlled to said one or more rocket motors.

26. The apparatus as set forth in claim 23, wherein said rocket further comprises a directional control device, and wherein said directional control device is utilized to control said regulating valves on said fuel or on said oxidant supply lines, in order to control the direction of said rocket.

27. The apparatus as set forth in claim 19, wherein the amount of thrust augmentation is up to as much as one hundred thirty five percent.

28. The apparatus as set forth in claim 19, wherein the amount of thrust augmentation is up to as much as two hundred sixty four percent.

29. A rocket suitable for use in atmospheric air, said rocket comprising:
- (a) a secondary air flow containment casing having an inlet and an outlet;
- (b) a rocket motor adapted to burn a fuel and an oxidant to produce a hot exhaust primary gas flow, said rocket motor having
  - (i) a nozzle interior throat portion, said nozzle interior throat portion located upstream of, and peripheral to, said outlet of said secondary air flow containment casing outlet, and
  - (ii), a nozzle exterior throat portion, said nozzle exterior throat portion positioned upstream of, and peripheral to, said outlet of said secondary airflow containment casing, wherein
  - (iii) said nozzle exterior throat portion and said nozzle interior throat portion are adapted to discharge therebetween said hot exhaust primary gas flow from said rocket motor;
- (c) an outlet nozzle, said outlet nozzle having a preselected contour, said outlet nozzle extending for a preselected distance downstream from said nozzle interior throat portion;
- (d) so that said hot exhaust primary gas flow induces said secondary air flow through said secondary air flow containment casing, thereby causing said secondary air flow from said secondary air flow containment casing to mix with said hot exhaust primary gas flow so as increase total momentum of gases exiting said rocket.

30. The apparatus as set forth in claim 29, wherein said secondary air flow containment casing is circular.

31. The apparatus as set forth in claim 29, wherein said secondary air flow containment casing is oval.

32. The apparatus as set forth in claim 29, wherein said outlet nozzle comprises an expansion outlet nozzle.

33. The apparatus as set forth in claim 29, wherein said outlet nozzle comprises a plug flow nozzle.

34. The apparatus as set forth in claim 29, further comprising fuel and oxidant supply lines to each of said one or more of said rocket motors.

35. The apparatus as set forth in claim 34, further comprising a regulating valve on said fuel supply line, so that fuel supply control can be controlled to said one or more rocket motors.

36. The apparatus as set forth in claim 29, further comprising a regulating valve on said oxidant supply line, so that supply of oxidant can be controlled to said one or more rocket motors.

37. The apparatus as set forth in claim 34, wherein said rocket further comprises a directional control device, and wherein said directional control device is utilized to control said regulating valves on said fuel or on said oxidant supply lines, in order to control the direction of said rocket.

* * * * *